United States Patent
Datir et al.

(10) Patent No.: US 12,242,017 B2
(45) Date of Patent: Mar. 4, 2025

(54) FORMATION ANALYSIS INCORPORATING IDENTIFICATION OF IMMOVABLE AND VISCOUS HYDROCARBONS

(71) Applicant: Schlumberger Technology Corporation, Sugar Land, TX (US)

(72) Inventors: Harish B. Datir, Tananger (NO); Jean-Marc Donadille, Clamart (FR); Oliver C. Mullins, Houston, TX (US); Vladislav Achourov, Tananger (NO); Lalitha Venkataramanan, Lexington, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 498 days.

(21) Appl. No.: 17/310,998

(22) PCT Filed: Mar. 11, 2020

(86) PCT No.: PCT/US2020/021952
§ 371 (c)(1),
(2) Date: Sep. 3, 2021

(87) PCT Pub. No.: WO2020/185809
PCT Pub. Date: Sep. 17, 2020

(65) Prior Publication Data
US 2022/0128727 A1   Apr. 28, 2022

Related U.S. Application Data

(60) Provisional application No. 62/816,791, filed on Mar. 11, 2019.

(51) Int. Cl.
*G01V 3/38*   (2006.01)
*E21B 49/08*  (2006.01)
(Continued)

(52) U.S. Cl.
CPC .............. *G01V 3/38* (2013.01); *E21B 49/081* (2013.01); *E21B 49/087* (2013.01); *G01V 3/20* (2013.01);
(Continued)

(58) Field of Classification Search
CPC .............................. G01V 3/18; E21B 2200/20
See application file for complete search history.

(56) References Cited

U.S. PATENT DOCUMENTS 4,786,873 A   11/1988   Sherman
4,972,149 A   11/1990   Cox et al.
(Continued)

FOREIGN PATENT DOCUMENTS

GB    2336008 A    10/1999
WO    1999028832   6/1999
(Continued)

OTHER PUBLICATIONS

Flaum, Charles, Speier, Peter, Kleinberg, Robert L., and Steve Crary. "Bound Fluid Estimates." Paper presented at the SPWLA 40th Annual Logging Symposium, Oslo, Norway, May 1999. (Year: 1999).*

(Continued)

*Primary Examiner* — Son T Le
*Assistant Examiner* — Brian Butler Geiss
(74) *Attorney, Agent, or Firm* — Jeffrey D. Frantz (57) ABSTRACT

Methods and systems are provided for conducting formation analysis. Data from borehole logging tools is used to conduct a petrophysical analysis of the formation in order to determine (quantify) total porosity and formation matrix permittivity for an interval of the formation. Noninvaded zone water saturation and flushed zone water saturation for the interval of the formation is determined using a saturation model of the interval. The noninvaded zone water saturation (Continued)

is compared to the flushed zone water saturation, and the results of the comparison are used to determine that the interval of the formation contains movable hydrocarbon, immobile hydrocarbon or movable formation water.

19 Claims, 4 Drawing Sheets

(51) Int. Cl.
    *G01V 3/20*     (2006.01)
    *G01V 3/32*     (2006.01)
    *G01V 20/00*     (2024.01)

(52) U.S. Cl.
    CPC ............... *G01V 3/32* (2013.01); *G01V 20/00* (2024.01); *E21B 2200/20* (2020.05)

(56) References Cited

U.S. PATENT DOCUMENTS

| | | | |
|---|---|---|---|
| 5,379,216 | A | 1/1995 | Head |
| 5,812,068 | A | 9/1998 | Wisler et al. |
| 5,992,519 | A | 11/1999 | Ramakrishnan et al. |
| 6,018,497 | A | 1/2000 | Gunasekera |
| 6,078,869 | A | 6/2000 | Gunasekera |
| 6,106,561 | A | 8/2000 | Farmer |
| 6,230,101 | B1 | 5/2001 | Wallis |
| 6,313,837 | B1 | 11/2001 | Assa et al. |
| 6,408,290 | B1 | 6/2002 | Thiesson et al. |
| 6,442,487 | B2 | 8/2002 | Kim |
| 6,556,960 | B1 | 4/2003 | Bishop et al. |
| 6,980,940 | B1 | 12/2005 | Gurpinar et al. |
| 7,164,990 | B2 | 1/2007 | Bratvedt et al. |
| 7,433,851 | B2 | 10/2008 | Mirowski |
| 7,743,006 | B2 | 6/2010 | Woronow et al. |
| 8,401,832 | B2 | 3/2013 | Ghorayeb et al. |
| 8,775,358 | B2 | 7/2014 | Bonawitz et al. |
| 10,487,649 | B2 | 11/2019 | Tilke et al. |
| 2002/0116351 | A1 | 8/2002 | Skaanning et al. |
| 2003/0105590 | A1 | 6/2003 | Mollison et al. |
| 2003/0132934 | A1 | 7/2003 | Fremming |
| 2003/0216897 | A1 | 11/2003 | Endres et al. |
| 2003/0220906 | A1 | 11/2003 | Chickering |
| 2004/0220846 | A1 | 11/2004 | Cullick et al. |
| 2005/0149307 | A1 | 7/2005 | Gurpinar et al. |
| 2005/0216496 | A1 | 9/2005 | Chickering |
| 2006/0184329 | A1 | 8/2006 | Rowan et al. |
| 2006/0197759 | A1 | 9/2006 | Fremming |
| 2007/0011113 | A1 | 1/2007 | Mosleh et al. |
| 2007/0226158 | A1 | 9/2007 | Woronow et al. |
| 2008/0040086 | A1 | 2/2008 | Betancourt et al. |
| 2009/0012746 | A1 | 1/2009 | Kairo et al. |
| 2009/0020284 | A1 | 1/2009 | Graf |
| 2009/0314490 | A1 | 12/2009 | Prange |
| 2010/0084191 | A1 | 4/2010 | Chapman et al. |
| 2012/0317060 | A1 | 12/2012 | Jebara |
| 2013/0046524 | A1 | 2/2013 | Gathogo et al. |
| 2015/0081265 | A1 | 3/2015 | Kauerauf et al. |
| 2016/0281497 | A1 | 9/2016 | Tilke et al. |
| 2016/0348480 | A1* | 12/2016 | Zuo ..................... E21B 47/10 |
| 2017/0123104 | A1 | 5/2017 | Donadille et al. |
| 2018/0120468 | A1 | 5/2018 | Seleznev et al. |
| 2018/0231681 | A1 | 8/2018 | Katterbauer et al. |
| 2020/0242497 | A1 | 7/2020 | Shahkarami |

FOREIGN PATENT DOCUMENTS

| | | |
|---|---|---|
| WO | 1999064896 | 12/1999 |
| WO | 2004049216 A1 | 6/2004 |
| WO | 2005122001 A1 | 12/2005 |
| WO | 2008118242 A1 | 10/2008 |
| WO | 2010008994 A2 | 1/2010 |
| WO | 2017127108 A1 | 7/2017 |
| WO | 2018017108 A1 | 1/2018 |
| WO | 2018183223 A1 | 10/2018 |
| WO | 2020185809 A1 | 9/2020 |
| WO | 2020185840 A1 | 9/2020 |

OTHER PUBLICATIONS

Widarsono, Bambang. "Irreducible Water Saturation and Its Governing Factors: Characteristics of Some Sandstones in Western Indonesia." Scientific Contributions Oil and Gas 34.1 (2011): 19-34. (Year: 2011).*
Schlumberger, Dielectric Scanner Brochure, 2013 (Year: 2013).*
Well Log Interpretation, PetroWiki, Jun. 2015, https://petrowiki.spe.org/Well_log_interpretation (Year: 2015).*
Extended European Patent Application No. 20770407.3 dated Nov. 3, 2022, 8 pages.
Allen, P.A. et al., "Basin Analysis: Principles and Application to Petroleum Play Assessment", 2013, 3rd Edition, Chapter 11, Wiley-Blackwell (84 Pages).
Barber, D., "Bayesian Reasoning and Machine Learning", 2012, 1st Edition, Cambridge University Press, Chapter 9.4.3, 8.5.1 (30 pages).
Bishop, C.M., "Pattern Recognition and machine Learning", 2006, 1st Edition, Springer, Chapter 8.2.2 (18 pages).
Bjorlykke, K., "Petroleum Geoscience", 2010, Springer, Chapter 16.6 (total 10 pages).
Bollobas, B., "Modern Graph Theory", 1998, Springer, Chapter 1.1 (69 pages).
Feynman, R.P., "The Theory of Positrons", Phys. Rev., 1949, 76(6), pp. 749-759.
Koller, D. et al., (2009)—Probabilistic Graphical Models: Principles and Techniques, the MIT Press, (4 pages).
Koller, D. et al., "Object Oriented Bayesian Networks", in Thirteenth Annual Conference on Uncertainty in Artificial Intelligence, 1997, pp. 302-313.
Kschischang, F. R., et al., "Factor Graphs and Sum-Product Algorithm", IEEE Transactions on Information Tehery, 2001, 47(2), pp. 498-519.
Minka, T. et al., "Gates: A graphical notation for mixture models", in NIPS 08: Advances in Neural Information Processing Systems, 2008, (16 pages).
Wyllie, M. R. J. et al., "Elastic Wave Velocities in Heterogeneous and Porous Media", Geophysics, 1956, XXI(1), pp. 41-70.
Lee et al., "Dynamic structure learning of factor graphs and parameter estimation of a constrained nonlinear predictive model for oilfield optimization", International Conference on Artificail Intelligence, 2010, pp. 633-639.
Loeliger, "An Introduction to Factor Graphs", IEEE Signal Processing Magazine, Jan. 2004, (14 pages).
"Belief propagation", Wikipedia, Accessed Sep. 9, 2015, https://en.wikipedia.org/wiki/Belief_propagation, (8 pages).
Martinelli, G. et al., "Dynamic exploration designs for graphical models using clustering with applications to petroleum exploration" Knowledge-Based Systems 58 (2014) pp. 113-162, Available Online Aug. 28, 2013.
Martinelli, G. e tla., Building Bayesian networks from basin modeling scenarios for improved geological decision making Petroleum Geoscience, 2012. (34 pages).
Martinelli, G. et al., "Dynamic decision making for graphical models applied to oil exploration", European Journal of Operational Research, 2013, 230, pp. 688-702.
Fanchi, J. R., Integrating forward modeling into reservoir simulation, Journal of Petroleum Science and Engineering, 2001, 32, pp. 11-21.
Srihari, S., Factor Graphs and Inference, Leture Note p. 1-29 available online Nov. 28, 2011 (30 pages).
Cano, A. et al., "Heuristic Algorighms for the Triangulation of Graphs", Jul. 1994, Advances in Intelligent Computing—IPMU 94, SpringerLink. Item 10 p. 98-107.
Neil et al., "Building Large-Scale Bayesian networks", The Knowledge Engineering Review, 1999, pp. 257-284.

(56) References Cited

OTHER PUBLICATIONS

Elwert, F., "Graphical Causal Models" in Handbook of Casual Analysis for Social Research, S. L. Morgan, editor, 2006, Dordrecht: Springer Netherlands, pp. 245-273.
Pearl, J., "Reverend Bayes on inference engines: A distributed hierarchial approach", In Proceedings of the AAAI National Conference on AI, 1982, pp. 133-136.
Pearl, J., Probabilistic Reasoning in Intelligent Systems: networks of Plausible Inference, 1988, 1st Edition, Morgan Kaufmann. Chapter 3.1, 3.3, 6.4.2, p. 186 (total 115 pages).
Pearl, J., 1997, "The New Challenge: From a Century of Statistics to the Age of Causation", Computing Science and Statistics, 1997, 4659.
Pearl, J., 2013, "Linear Models: A Useful "Microscope" for Causal Analysis", Journal of Casual Inference, 1(1), pp. 155-170.
Ramakrishnan, T. S. et al., "A Model-Based Interpretation Methodology for Evaluating Carbonate Reservoirs", 2001, SPE-71704, Spe Annual Technical Conference and Exhibition, (15 pages).
Wright, S., "Correlation and Causation", Journal of Agricultural Research, 1921, 20(7), pp. 557-585.
Mullins, O. C. et al., "The Critical Role of Asphaltene Gradients and Data Integration in Reservoir Fluid Geodynamics Analysis", SPE-187277-MS presented at the SPE Annual Technical Conference and Exhibition held in San Antonio, Texas, USA, 2017, (20 pages).
Wikipedia contributors, "Value of information" In Wikipedia, the Free Encyclopedia. Retrieved, Mar. 20, 2019, from [https://en.wikipedia.org/w/index.phptitle=Value_of_information oldid=884483499], (Feb. 21, 2019), 5 pages.
Skataric, M. et al., "An approach based on Hierarchical Bayesian Graphical Models for measurement interpretation under uncertainty", 43rd Annual Review of Progress in Quantitative Nondestructive Evaluation, QNDE, 2017, (8 pages).
Pearl, J. (2009)—Causality: Models, Reasoning and Inference, Cambridge University Press; 2nd edition, (2 pages).
Pearl, J. et al., (2018)—The Book of Why: The New Science of Cause and Effect, Basic Books, (5 pages).
International Search Report and Written Opinion of PCT Application No. PCT/US2020/021952 dated Jul. 2, 2020, 9 pages.
International Preliminary Report on Patentability of PCT Application No. PCT/US2020/021952 dated Sep. 23, 2021, 6 pages.
International Search Report and Written Opinion of PCT Application No. PCT/US2020/022003 dated Jun. 15, 2020, 15 pages.
International Preliminary Report on Patentability of PCT Application No. PCT/US2020/022003 dated Sep. 23, 2021, 7 pages.
International Search Report and Written Opinion for corresponding PCT Application No. PCT/US2016/23906, dated Jul. 14, 2016, 8 pages.
International Preliminary Report on Patentability of related International Patent Application No. PCT/US2016/023906 dated Oct. 5, 20217, 7 pages.
Cain, "Planning Improvements in Natural Resources Management", Centre for Ecology & Hydrolog, 2001, vol. 44, Appendix 1 p. 95, pp. 110-111.
Darwich 2009, Modeling and Reasoning with Bayesian Networks. Chapter 5.4.1 (5 pages).
Nelson, E. B., et al., "Well Cementing", 2006, 2nd Edition, Schlumberger, Fig 1-4 on p. 15 (total 22 pages).
Pfeffer, A., "Practical Probabilistic Programming", 2015, Manning Publications, pp. 257-281.
Shipley, B., Cause and Correlation in Biology: A User's Guide to Path Analysis, Structural Equations and Casual Inference, 2002, 1st Edition, Cambridge University Press, pp. 153-187.
Office Action issued in U.S. Appl. No. 17/310,991 dated Jun. 27, 2024, 43 pages.
Office Action issued in U.S. Appl. No. 17/310,991 dated Jul. 26, 2024, 8 pages.
Office Action issued in U.S. Appl. No. 17/310,991 dated Sep. 5, 2024, 52 pages.

* cited by examiner

FORMATION ANALYSIS INCORPORATING IDENTIFICATION OF IMMOVABLE AND VISCOUS HYDROCARBONS

CROSS-REFERENCE TO RELATED APPLICATIONS

This application is a National Stage Entry of International Patent Application No. PCT/US2020/021952, filed on Mar. 11, 2020, which claims priority to U.S. Provisional Patent Application No. 62/816,791, filed on Mar. 11, 2019.

FIELD

The subject disclosure relates to the evaluation of geological formations. More particularly, the subject disclosure relates to the use of data obtained from borehole tools in analyzing and understanding the producibility behavior of a hydrocarbon reservoir in a formation.

BACKGROUND

In the hydrocarbon industry, it is highly desirable to know whether a hydrocarbon reservoir in a formation is producible, and if so, the economics associated with that production. Because information regarding the hydrocarbon reservoir producibility can be difficult to ascertain, the industry sometimes uses a procedure known as drill stem testing (DST).

DST is an oil and gas exploration procedure which isolates, stimulates and causes fluid flow in a downhole formation in order to determine the fluids present and the rate at which they can be produced. The primary objective of a DST is an evaluation of the commercial viability (economic potential) of production zones in the formation. The evaluation necessarily includes an estimate of productive capacity, pressure, permeability and extent of the oil or gas reservoir.

DST involves deploying a series of tools known as a test bottomhole assembly (BHA) including one or more packers, which isolate sections of the well for the testing process, valves that may be opened or closed during testing, and recorders used to document parameters during testing.

While DST is useful, it can add significantly to costs and time, and the results may be more local than desired. Accordingly, there has long been a need for other techniques that could be used to replace or supplement DST.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, reservoir producibility is predicted from an accurate determination and quantification of movable hydrocarbon provided by the comparison of an uninvaded zone saturation computed using a dielectric-derived MN parameter and univaded zone resistivity with the water saturation of the flushed zone obtained of a dielectric tool.

In embodiments, non-movable (solid) or hard-to-move (viscous) organics can be identified using a petrophysical evaluation of the formation (from various logs of the formation) and comparing the evaluation to an independent total porosity determination made from nuclear magnetic resonance (NMR) tests in order to find "missing porosity". The "missing porosity" is allocated (i.e., corresponds) to non-movable (e.g., solid) or hard-to-move (e.g., highly viscous) organic matter such as deposited asphaltenes, or tar or bitumen or wax or heavy oil.

In embodiments, a wireline formation tool may be used to determine whether measured movable fluids are consistent with the petrophysical evaluation. Downhole fluid analysis (DFA) may be used to measure hydrocarbon fluid gradients, allowing thermodynamic analysis of the fluid column. If petrophysical interpretation agrees with NMR analysis, movable oil may be located in a tar zone, which can also be detected and validated by wireline formation sampling results.

In embodiments, a reservoir fluid geodynamic process (RFG) can be performed that gives rise to the DFA-measured hydrocarbon gradients and the immovable/highly viscous hydrocarbons. Evaluation of other data can be integrated into the RFG identification, including (by way of example and not by way of limitation) core analysis, cuttings analysis, mug gas isotope and compositional analysis, geochemical analysis, determination of asphaltene onset pressure (AOP), compositional analysis including GCxGC (2D gas chromatography) analysis, petroleum modeling and basin modeling.

In embodiments, the RFG process or processes can be extended (projected) in the vicinity of the well and/or across the entire field. From this, impact on aquifer support and sweep, variation of productivity index, necessity of chemical injection, and other production related concerns may be predicted.

Additional aspects, embodiments, and advantages of the disclosure may be understood with reference to the following detailed description taken in conjunction with the provided drawings.

DETAILED DESCRIPTION

The particulars shown herein are by way of example and for purposes of illustrative discussion of the examples of the subject disclosure only and are presented in the cause of providing what is believed to be the most useful and readily understood description of the principles and conceptual aspects of the subject disclosure. In this regard, no attempt is made to show details in more detail than is necessary, the description taken with the drawings making apparent to those skilled in the art how the several forms of the subject disclosure may be embodied in practice.

Before turning to the figure, it is useful to understand at least one typical scenario where this disclosure is applicable. Thus, by way of example only, in a scenario of basin subsidence, source rock first moves into the oil (temperature) window, and with continued subsidence, into the gas window. Consequently, many reservoirs experience an oil charge followed by a gas charge. If the reservoir pressure is sufficiently high, the newly charged gas will dissolve into the oil. Upon increase in solution gas, the heaviest component of the oil, the asphaltenes, are destabilized. The destabilized asphaltenes can undergo many different processes. For example, they (the asphaltenes) can deposit as a solid up structure near the gas-oil contact (GOC); they can migrate to the base of the reservoir for example at the oil-water contact (OWC) where they can then deposit as a solid phase; they can deposit with substantial resin (the next to heaviest oil component) forming a viscous tar; or they can deposit in and near the reservoir charge points either as a solid or a tar. In these cases, the asphaltenes remaining in the oil can be close to unstable, yielding a high asphaltene onset pressure (AOP). All of these scenarios have significant and different effects on production.

During the drilling of a wellbore to access a reservoir, drilling fluid (such as mud) is introduced into the wellbore under pressure in order to flush rock chips and other unwanted debris out of the wellbore. Such pressure is typically greater than the pressure of the formation traversed by the wellbore in order to prevent a phenomenon known as well blowout. The resultant pressure differential between the pressure of the drilling fluid and the formation pressure forces drilling fluid filtrate (commonly referred to as "mud filtrate") into the permeable formation and deposits solid particles of the drilling fluid on the wellbore wall forming a mudcake. The mudcake typically has a very low permeability. Once developed, the mudcake can reduce the rate of further mud filtrate invasion into the formation. In a region very close to the wellbore wall, most of the original formation water and some of the hydrocarbons may be flushed away by the mud filtrate. This region is known as the "flushed zone", or the "invaded zone". If the flushing is complete, the flushed zone pore space contains only mud filtrate; in addition, if the flushed zone was originally hydrocarbon bearing, it would contain residual hydrocarbons. Further out from the wellbore wall, the displacement of the formation fluids by the mud filtrate is less and less complete thereby resulting in a second region, this second region undergoing a transition from mud filtrate saturation to original formation water saturation. The second region is known as the "transition zone". The extent or depth of the flushed and transition zones depends on many parameters, among them being the type and characteristics of the drilling fluid, the formation porosity, the formation permeability, the pressure differential, and the time since the formation was first drilled. The undisturbed formation beyond the transition zone is known as the "uninvaded" or "virgin" or "uncontaminated" zone. The flushing or moving of formation fluid is considered independent of any chemical reaction and only focused on pressure differential mechanism.

Figure 1:
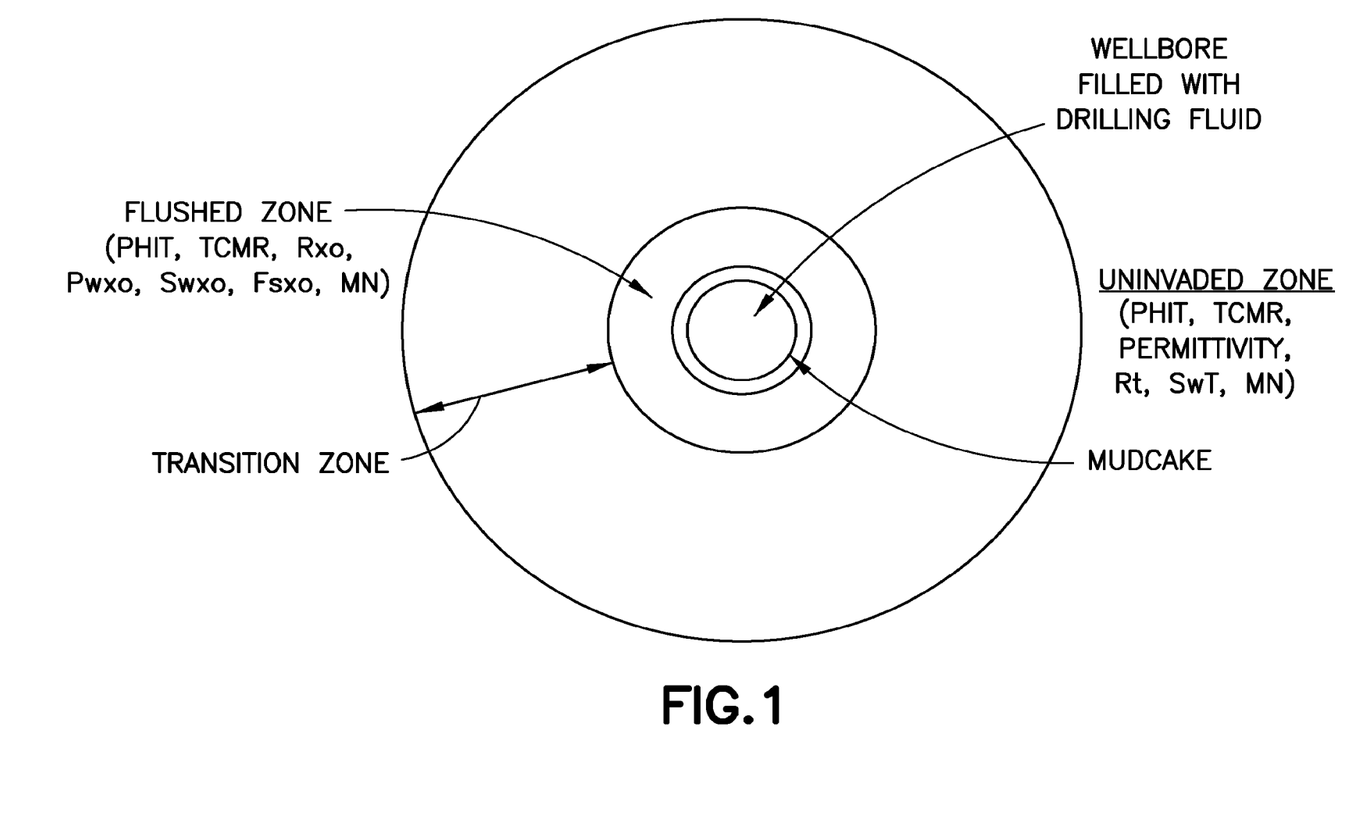
FIG. 1 is a schematic cross-sectional view of a wellbore that traverses a formation, including the zones that result from invasion of drilling fluid into the formation as a result of the drilling the wellbore.

FIG. 1 is a schematic cross section of a wellbore, showing the results of the mud invasion process during drilling the wellbore. The wellbore is filled with drilling fluid. A layer of mudcake covers the wellbore wall. The surrounding formation includes a flushed zone, a transition zone, and an uninvaded zone extending radially from the wellbore wall.

The flushed zone can be characterized by a total porosity PHIT, a total porosity TCMR, a resistivity Rxo, a water-filled porosity Pwxo, a water saturation Swxo, a water salinity Fsxo and a parameter MN. Here, the total porosity PHIT or TCMR is the volume fraction of the pore space of the formation martix, which is assumed to be the same in both the flushed zone and the uninvaded zone. The resistivity Rxo governs the electric current responses of the formation in the flushed zone, which is dominated by the electric conduction through the water that saturates the pore space of the flushed zone. The water-filled porosity Pwxo is the fraction of the total porosity that is filled with water in the flushed zone. The water saturation Swxo is the fraction of water in the flushed zone. The water salinity Fsxo represents the sality of the water in the flushed zone. The parameter MN is based on the cementation component m and the saturation exponent n of the formation matrix, which is assumed to be the same in both the flushed zone and the uninvaded zone; it holds in the absence of mud filtrate reaction by not causing any change in flushed zone rock wettability.

The uninvaded zone can be characterized by the total porosity PHIT or TCMR, a permittivity, a resistivity Rt, a water saturation SwT, and parameter MN. Here, the total porosity PHIT or TCMR is the volume fraction of the pore space of the formation martix, which is assumed to be the same in both the flushed zone and the uninvaded zone. The permittivity reprepresents the matrix permittivitty or the dielectric permittivity of the formation in the uninvaded zone, which effects the frequency-dependent electrical respose of the formation in the uninvaded zone. The Rt is the true formation resistivity in the uninvaded zone, which is dominated by the electric conduction through the water (i.e., connate water) that saturates the pore space of the uninvaded zone. The SwT is the fraction of water that fills the pore space of the uninvaded zone. The parameter MN is based on the cementation component m and the saturation exponent n of the formation matrix, which is assumed to be the same in both the flushed zone and the uninvaded zone; it holds in the absence of mud filtrate reaction by not causing any change in flushed zone rock wettability.

Figure 2:
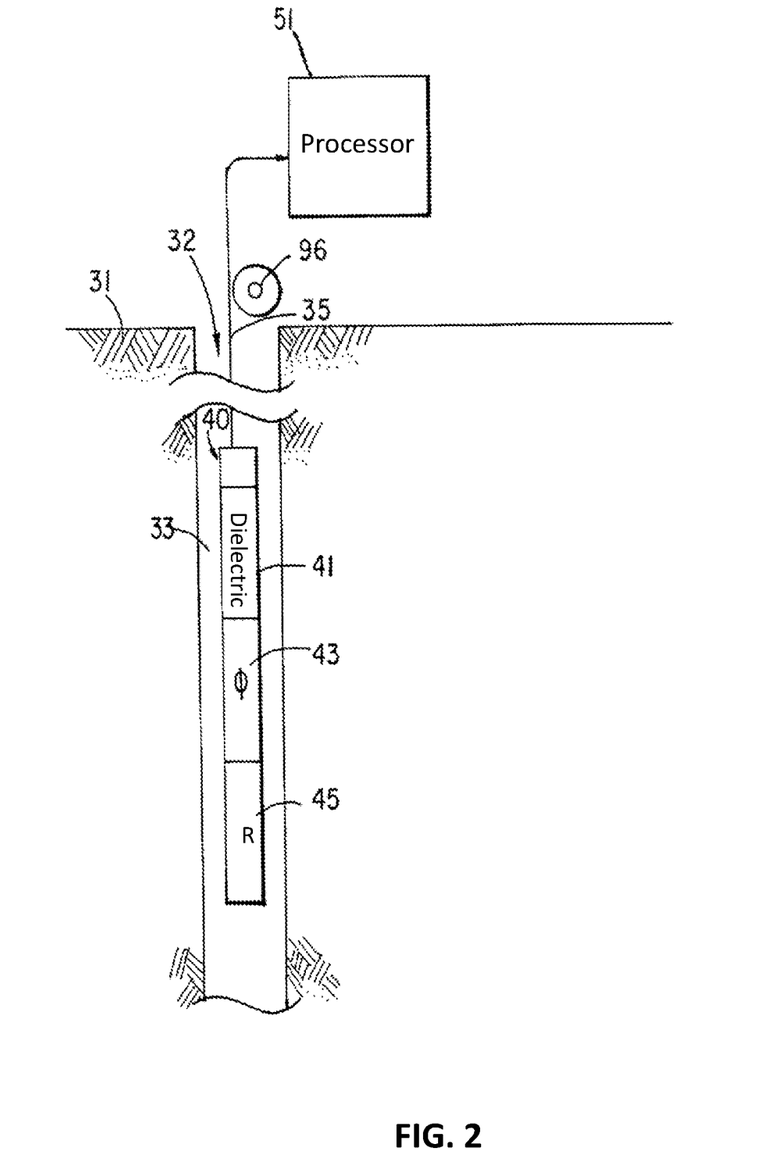
FIG. 2 is a schematic diagram of an exemplary wellsite system according to the present disclosure.

FIG. 2 shows an apparatus which can be used to practice an embodiment of the present disclosure for investigation of an earth formation 31 traversed by a wellbore 32, which is filled with a drilling fluid 33. A logging device 40 is suspended in the wellbore 32 on an armored cable 35, the length of which substantially determines the depth of the downhole logging device 40. The cable length is controlled by conventional means at the surface (not shown). A processor 51, shown at the surface, although portions thereof may be downhole, represents processing circuitry for the various logging measurements performed by the logging device 40. A sheave wheel 96 can be conventionally provided for determination of depth of the logging device 40, and signals therefrom are coupled to the processor 51 for integration with the logging measurements.

The downhole logging device 40 of the present embodiment comprises a tool string that includes a number of tools. In the present embodiment, the reference numeral 45 represents one or more resistivity tools that measure the resistivity of the surrounding formation. The resistivity tool(s) can include an array induction tool (such as the AIT tool of Schlumberger), a laterlog tool (such as the HRLA tool of Schlumberger, or a focused induction tool (such as the DIT tool of Schlumberger) as are well known in the arts. Note that resistivity and conductivity are inverses, and it will be understood that references herein to one of these imply that the other could be substituted, in an inverse sense. The resistivity tool(s) can be configured to measure resistivity at varying radial depths of investigation (DOI) that extend from the wellbore wall into the formation.

The tool string of downhole apparatus also includes, in this embodiment, a logging tool 43 which is used to obtain measurements of porosity of the formation. This logging tool 43 may comprise, for example, a conventional type of neutron-density logging device or other suitable tool measurements that combine nuclear, density, lithology tools for logging analysis, such as the ECS (elemental capture spectroscopy) tool, the NGS (natural gamma ray spectrometry) tool, the LDS (litho-density sonde) tool, and the APS (accelerator porosity sonde) tool, all of Schlumberger.

Further included in the tool string is a dielectric tool 41 which can be used to obtain multifrequency dielectric dispersion measurements of conductivity and permittivity of the formation. For example, the dielectric tool can be the Dielectric Scanner tool of Schlumberger.

In alternate embodiments, the tool string can possibly include an NMR tool for performing NMR measurements of the formation. For example, the NMR tool can be the CMR-plus (combinable magnetic resonance) tool of Schlumberger.

The tool string can also typically include appropriate conventional telemetry equipment and power supplies (not separately shown), as well as other logging subassemblies conventionally used with equipment of this type. It will also be understood that at least some of the measurements hereof could be made by equipment on a drill string as part of a logging-while drilling tool string.

Figure 3:
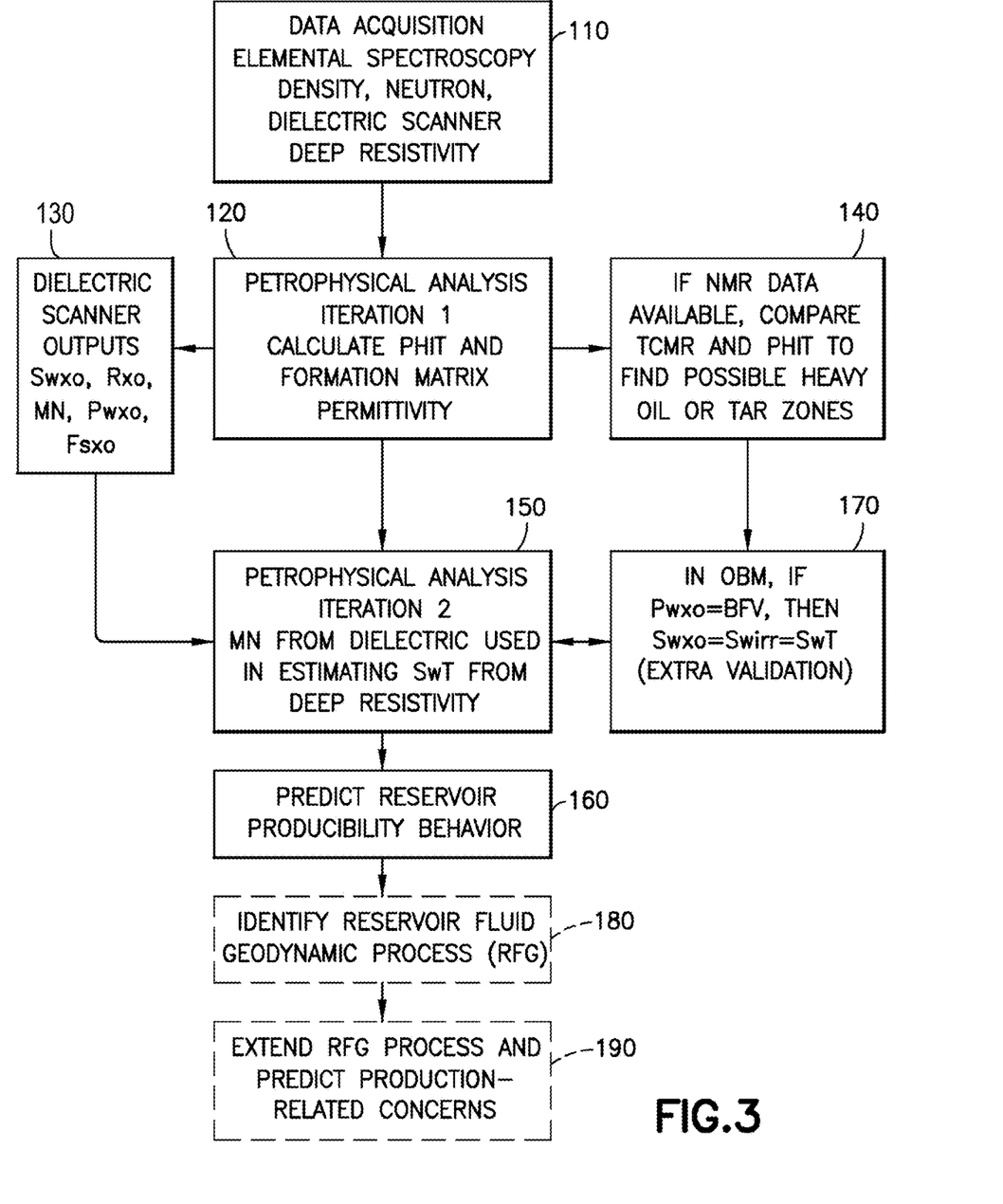
FIG. 3 is a flow-chart of a workflow of an embodiment of the present disclosure.

Turning now to FIG. 3, an integrated workflow for an embodiment is provided. The workflow can be conducted over one or more zones of interest (or intervals) along a wellbore in a formation in order to characterize the formation. Data is acquired at 110. The data acquisition may include elemental spectroscopy, density, neutron, and deep resistivity data obtained from multiple borehole tools, such as those tools described above woth respect to FIG. 2. The tools may include one or more of the following Schlumberger tools: ECS (elemental capture spectroscopy sonde); NGS (natural gamma ray spectrometry tool); LDS (litho-density sonde); APS (accelerator porosity sonde); HRLA (high-resolution laterolog array); DIT (dual induction-spherically focused resitivity tool); HNGS (hostile environment natural gamma ray sonde); AIT (array induction imager); Dielectric Scanner; and/or other tools. The Dielectric Scanner is an electrical array tool that conducts permittivity and conductivity measurements at multiple frequencies. On or more of these and/or other tools may be provided as part of a "triple-combo" tool string.

At 120, the data is used to conduct a first iteration of a petrophysical analysis and to calculate and quantify total porosity (PHIT) and formation matrix permittivity or dielectric permittivity for a zone of interest (or interval) in the formation. It will be appreciated that lithology effects on neutron-density logs can be quantified using a detailed mineralogy analysis by solving for the varying amounts of quartz, clay, fedspar, and carbonate minerals, etc. This provides an accurate estimate of matrix permittivity or dielectric permittivity for the zone of interest (or interval) in the formation. In addition, an accurate porosity model is built which respects the lithology. This may be done using obtained matrix density from a petrophysical interpretation program such as ELAN which uses all available inputs such as elemental spectroscopy, spectral gamma ray, etc., to support and correct nuclear measurements.

In one embodiment, in addition to the tools that acquire data at 110 being run in the wellbore, an NMR tool such as the Schlumberger CMR-plus (combinable magnetic resonance tool) can also be run in the wellbore at 140. The CMR-plus tool can measure of total porosity (TCMR) for the zone of interest (or interval) in the formation. The PHIT calculated at 120 can be compared to the TCMR determination for the zone of interest (or interval) in the formation. If TCMR<PHIT for the zone of interest (or interval) in the formation, that zone (or interval) can be flagged as including "missing porosity" in the form of immovable or viscous hydrocarbons such as heavy oil, asphaltene, tar or bitumen, or wax or gas.

At 130, the outputs of a dielectric tool, such as the Dielectric Scanner tool of Schlumberger, are provided for the zone of interest (or interval) in the formation. In embodiments, such outputs can include the flushed zone water saturation (Swxo), flushed zone water filled porosity (Pwxo), flushed zone resistivity (Rxo), the parameter MN related to the exponents m and n, and the flushed zone formation (water) salinity Fsxo for the zone of interest (or interval) in the formation.

At 150, the measurements of permittvity and total porosity PHIT from 120 along with the outputs obtained from the dielectric tool at 130 are used to generate a saturation model for the zone of interest (interval). A second interation of petrophysical analysis is performed on the saturation model to solve for the uninvaded zone water saturation SwT for the zone of interest (interval) given the MN parameter obtained the output of the dielectric tool in 140.

According to one embodiment, the reservoir producibility behavior for the zone of interest (interval) can then be predicted at 160 by comparing the flushed zone water saturation Swxo determined at 140 and the noninvaded zone water staturation SwT as set forth in Tables 1A and 1B. Table 1A applies to the interpretation in the case of water-based drilling fluid, which is labelled "DF WBM". Table 1B applies to the interpretation in the case of oil-based drilling fluid, which is labeled "DF OBM". The free water level depth can be deduced either via petrophysical logs where SwIrr<SwT or via pressure gradient.

TABLE 1A

| Saturation Profile | Condition | Interpretation (DF WBM) | Predicted results |
|---|---|---|---|
| Swxo > SwT < 1 | Above the oil/water contact SwIrr = SwT | Movable Hydrocarbon | HC sample |
| Swxo = SwT < 1 | | Immobile Hydrocarbon | Tight |
| Swxo = SwT < 1 | Below the oil/water contact SwIrr < SwT | Immobile Hydrocarbon | Water Sample |
| Swxo = SwT = 1 | | Movable Formation Water | Water Sample |

TABLE 1B

| Saturation Profile | Condition | Interpretation (DF OBM) | Predicted results |
|---|---|---|---|
| Swxo > SwT < 1 | Above the oil/water contact SwIrr = SwT | Mud breakdown, Movable Hydrocarbon | HC sample |

TABLE 1B-continued

| Saturation Profile | Condition | Interpretation (DF OBM) | Predicted results |
|---|---|---|---|
| $Swxo < SwT < 1$ | | Filtrate moving connate water plus Movable Hydrocarbon ($Rxo > Rt$) | HC sample |
| $Swxo = SwT < 1$ | | Filtrate moving formation Oil (PHIT = TCMR & Rxo = Rt) | HC sample |
| | | Immobile Hydrocarbon (TCMR < PHIT & Rxo = R) | Tight |
| $Swxo < SwT <= 1$ | Below the oil/water contact SwIrr < SwT | Movable Formation Water | Water Sample |

According to one embodiment, the results (interpretation) of Tables 1A and 1B can be validated by running a formation tester (such as the MDT of Schlumberger) in order to conduct a downhole fluid analysis (DFA). It should be noted that since the petrophysical interpretation is performed prior to formation tester operations, the petrophysical interpretation can be used to guide the selection of pressure testing and sampling points. This has the unique value of adding efficiency to the decision making process and saving important rig time by optimimzing the definition of pretesting and sampling depth and identifying "sweet spots" for successful testing, downhole fluid analysis, and samples collection without the need for repeated attempts in unfavorable zones.

In one aspect it can be noted that if the well is drilled in an under-balanced manner, or invasion has not occurred by the time of the logging, or if there has been a rapid mud cake build up which halted the invasion process, then Rxo=Rt. In other words, Swxo=SwT for all situations like above and below free water level, so Tables 1A and 1B will not be used to infer fluid movability.

According to one embodiment, where an oil-based drilling fluid (OBM) is being utilized in the borehole, at 170, for depths or zones flagged at 130, if the flushed zone water filled porosity (Pwxo) equals the bound fluid volume, then Swxo=Swirr=SwT, where Swirr is the irreducible water saturation. This determination acts as an extra validation to the disclosed methodology.

In one embodiment, a reservoir fluid geodynamic process (RFG) can be identified and used in 180, where the RFG gives rise to the reservoir producibility behavior determined according to Table 1A or Table 1B and/or the DFA-measured hydrocarbon gradients and the immovable/viscous hydrocarbons. Evaluation of other data can be integrated into the RFG process, including (by way of example and not by way of limitation) core analysis, cuttings analysis, mug gas isotope and compositional analysis, geochemical analysis, determination of asphaltene onset pressure (AOP), compositional analysis including GCxGC (2D gas chromatography) analysis, petroleum modeling and basin modeling.

In one embodiment, at 190 the RFG process or processes is extended (projected) in the vicinity of the well and/or across the entire field. From this, impact on aquifer support and sweep, variation of productivity index, necessity of chemical injection, and other production related concerns may be predicted.

In one aspect, the provided disclosure provides prediction of formation fluid mobility; i.e., whether the flow is primarily hydrocarbon or formation water. The disclosure provides a simple and straight-forward interpretation of deep versus shallow zone saturation without knowing the absolute permeability of the formation.

In one aspect, the salinity independent Swxo and MN parameter outputs of the dielectric tool at 130 can be utilized along with conventional data to provide improved answers and valid alternatives to conventional methods in challenging reservoirs. The deep resistivity based water saturation is estimated by using MN as a direct continuous input in the saturation model. This is also a better approach to handling the formation heterogeneity as a function of depth. If combined with elemental spectroscopy to derive corrected neutron-density total porosity, this also allows refining the porosity analysis; hence adding valuable information and quality control.

In one aspect, in OBM environments, the flushed zone resistivity (Rxo) is not available from conventional logging tools such as the microspherical log. In this case, the dielectric tool (such as the Dielectric Scanner of Schlumberger) can be used to provide the Rxo in OBM environments, and when integrated with NMR data and deep resistivity, it provides the prediction of formation fluid flow. The measurements share similar depth of investigation and resolution in OBM. Hence, they can be directly linked and integrated without the usual difficulties of using different data (and often different depth matching) such as synthetic resistivity measurement from a borehole imaging tool.

In one embodiment, in a water-based mud environment, if the MN and water volume are known from external information (e.g., from analysis of rcok core samples), then it is possible to replace the integration of the outputs of the dielecric tool or still apply the workflow when some support logs are not available.

In embodiments, the result data of any one or more of the operations of the workflow can be stored in computer memory (such as part of the memory of the computer device 2500 of FIG. 4) and output for subsequent access and analysis. Furthermore, the result data can be output for display in one or more logs or other visual representations to provide useful information for reservoir analysis and optimization.

Figure 4:
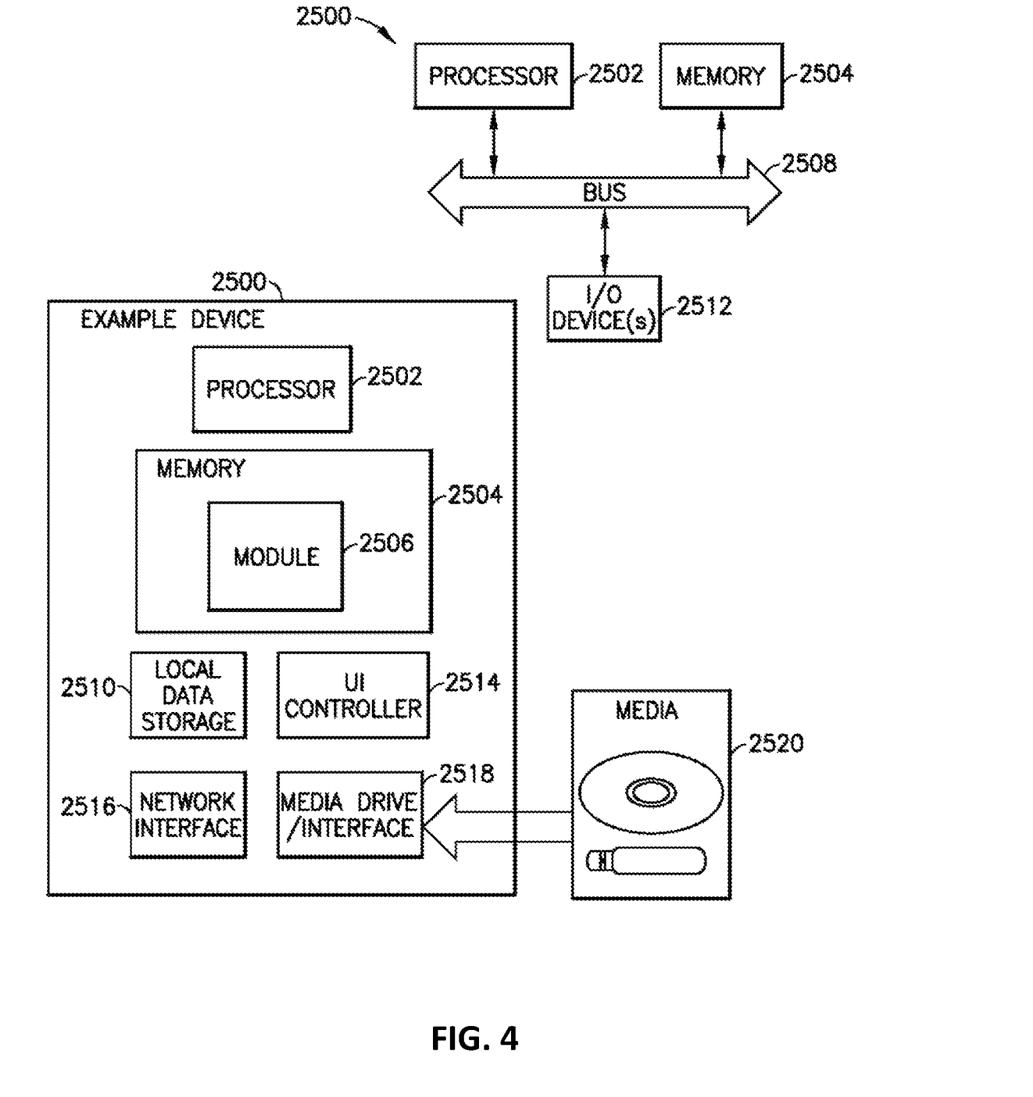
FIG. 4 is a schematic diagram of an exemplary computer processing system.

FIG. 4 illustrates an example device 2500, with a processor 2502 and memory 2504 that can be configured to implement parts or all of various embodiments of the workflow(s) described herein. Memory 2504 can also host one or more databases and can include one or more forms of volatile data storage media such as random-access memory (RAM), and/or one or more forms of nonvolatile storage media (such as read-only memory (ROM), flash memory, and so forth).

Device 2500 is one example of a computing device or programmable device and is not intended to suggest any limitation as to scope of use or functionality of device 2500 and/or its possible architectures. For example, device 2500 can comprise one or more computing devices, programmable logic controllers (PLCs), etc.

Further, device 2500 should not be interpreted as having any dependency relating to one or a combination of components illustrated in device 2500. For example, device 2500 may include one or more of computers, such as a laptop computer, a desktop computer, a mainframe computer, etc., or any combination or accumulation thereof.

Device 2500 can also include a bus 2508 configured to allow various components and devices, such as processors 2502, memory 2504, and local data storage 2510, among other components, to communicate with each other.

Bus 2508 can include one or more of any of several types of bus structures, including a memory bus or memory controller, a peripheral bus, an accelerated graphics port, and a processor or local bus using any of a variety of bus architectures. Bus 2508 can also include wired and/or wireless buses.

Local data storage 2510 can include fixed media (e.g., RAM, ROM, a fixed hard drive, etc.) as well as removable media (e.g., a flash memory drive, a removable hard drive, optical disks, magnetic disks, and so forth).

One or more input/output (I/O) device(s) 2512 may also communicate via a user interface (UI) controller 2514, which may connect with I/O device(s) 2512 either directly or through bus 2508.

In one possible implementation, a network interface 2516 may communicate outside of device 2500 via a connected network.

A media drive/interface 2518 can accept removable tangible media 2520, such as flash drives, optical disks, removable hard drives, software products, etc. In one possible implementation, logic, computing instructions, and/or software programs comprising elements of module 2506 may reside on removable media 2520 readable by media drive/interface 2518. Various processes of the present disclosure or parts thereof can be implemented by instructions and/or software programs that are elements of module 2506. Such instructions and/or software programs may reside on removable media 2520 readable by media drive/interface 2518 as is well known in the computing arts.

In one possible embodiment, input/output device(s) 2512 can allow a user (such as a human annotator) to enter commands and information to device 2500, and also allow information to be presented to the user and/or other components or devices. Examples of input device(s) 2512 include, for example, sensors, a keyboard, a cursor control device (e.g., a mouse), a microphone, a scanner, and any other input devices known in the art. Examples of output devices include a display device (e.g., a monitor or projector), speakers, a printer, a network card, and so on.

Various processes or parts of the workflow of the present disclosure may be described herein in the general context of software or program modules, or the techniques and modules may be implemented in pure computing hardware. Software generally includes routines, programs, objects, components, data structures, and so forth that perform particular tasks or implement particular abstract data types. An implementation of these modules and techniques may be stored on or transmitted across some form of tangible computer-readable media. Computer-readable media can be any available data storage medium or media that is tangible and can be accessed by a computing device. Computer readable media may thus comprise computer storage media. "Computer storage media" designates tangible media, and includes volatile and non-volatile, removable and non-removable tangible media implemented for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store the desired information, and which can be accessed by a computer.

In embodiments, any one or any portion or all of the steps or operations of the workflow as described above can be performed by a processor. The term "processor" should not be construed to limit the embodiments disclosed herein to any particular device type or system. The processor may include a computer system. The computer system may also include a computer processor (e.g., a microprocessor, microcontroller, digital signal processor, or general-purpose computer) for executing any of the methods and processes described above.

The computer system may further include a memory such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

Some of the methods and processes described above, can be implemented as computer program logic for use with the computer processor. The computer program logic may be embodied in various forms, including a source code form or a computer executable form. Source code may include a series of computer program instructions in a variety of programming languages (e.g., an object code, an assembly language, or a high-level language such as C, C++, or JAVA). Such computer instructions can be stored in a non-transitory computer readable medium (e.g., memory) and executed by the computer processor. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

Alternatively or additionally, the processor may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the methods and processes described above can be implemented using such logic devices.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims. Moreover, embodiments described herein may be practiced in the absence of any element that is not specifically disclosed herein.

In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A method of analyzing a formation traversed by a wellbore, the formation including a flushed zone and a noninvaded zone, the method comprising:
determining total porosity and permittivity of the noninvaded zone for an interval of the formation using data obtained from at least one logging device comprising one or more of a resistivity tool, a dielectric tool, and a logging tool run in the wellbore;
generating a saturation model of the interval of the formation using the data obtained from the at least one logging device run in the wellbore, the saturation model including water saturation of the flushed zone for the interval of the formation and water saturation of the noninvaded zone for the interval of the formation;
comparing the water saturation of the flushed zone for the interval of the formation and the water saturation of the noninvaded zone for the interval of the formation as provided by the saturation model, wherein comparing, when using a water-based drilling fluid, comprises:
comparing whether the water saturation of the flushed zone is greater than the water saturation of the noninvaded zone when the water saturation of the noninvaded zone has a value of less than 1;
comparing whether the water saturation of the flushed zone is equal to the water saturation of the noninvaded zone when the water saturation of the noninvaded zone has a value of less than 1; and
comparing whether the water saturation of the flushed zone is equal to the water saturation of the noninvaded zone when the water saturation of the noninvaded zone has a value equal to 1;
wherein comparing, when using an oil-based drilling fluid, comprises:
comparing whether the water saturation of the flushed zone is greater than the water saturation of the noninvaded zone when the water saturation of the noninvaded zone has a value of less than 1;
comparing whether the water saturation of the flushed zone is less than the water saturation of the noninvaded zone when the water saturation of the noninvaded zone has a value of less than 1;
comparing whether the water saturation of the flushed zone is equal to the water saturation of the noninvaded zone when the water saturation of the noninvaded zone has a value of less than 1; and
comparing whether the water saturation of the flushed zone is less than the water saturation of the noninvaded zone when the water saturation of the noninvaded zone has a value of less than or equal to 1; and
determining that the interval of the formation contains movable hydrocarbon, immobile or highly viscous hydrocarbon, or movable formation water based on results of said comparing for use in reservoir analysis.

2. The method of claim 1, wherein:
the data used to generate the saturation model is output from a dielectric tool and at least one additional tool run in the wellbore, wherein the dielectric tool measures conductivity and permittivity of the formation at multiple frequencies, and the at least one additional tool measures the total porosity of the formation.

3. The method of claim 1, wherein:
the saturation model provides the water saturation of the noninvaded zone for the interval of the formation given a parameter based on a cementation component "M" and a saturation exponent "N" of a formation matrix provided as an output from a dielectric tool run in the wellbore, wherein the dielectric tool measures conductivity and permittivity of the formation at multiple frequencies.

4. The method of claim 3, wherein:
the saturation model is based on a set of outputs of the dielectric tool, wherein the set of outputs include at least one flushed zone water saturation, flushed zone water filled porosity, flushed zone resistivity, and flushed zone formation salinity for the interval of the formation.

5. The method of claim 1, further comprising:
performing at least one reservoir fluid geodynamic process as a portion of the reservoir analysis.

6. The method of claim 1, further comprising:
in a case that the wellbore is drilled with the oil-based drilling fluid, determining whether water-filled porosity of the flushed zone of the interval of the formation corresponds to bound fluid volume; and
equating both the water saturation of the flushed zone for the interval of the formation and the water saturation of the noninvaded zone for the interval of the formation to irreducible water saturation when water filled porosity of the flushed zone of the interval of the formation matches bound fluid volume.

7. The method of claim 1, further comprising:
upon determining that the water saturation of the flushed zone for the interval of the formation matches the water saturation of the noninvaded zone for the interval of the formation, bypassing said determining that the interval of the formation contains movable hydrocarbon, immobile or highly viscous hydrocarbon, or movable formation water based on results of said comparing.

8. The method of claim 1, further comprising:
sampling fluid from the formation to confirm said determining, wherein locations of said sampling are selected based on said determining that the interval of the formation contains movable hydrocarbon, immobile or highly viscous hydrocarbon, or movable formation water based on results of said comparing.

9. The method of claim 1, further comprising:
obtaining an NMR total porosity for the interval of the formation from a nuclear magnetic resonance (NMR) tool run in the wellbore;
comparing the total porosity of the interval of the formation to the NMR total porosity for the interval of the formation; and
identifying the interval of the formation as containing the immobile or highly viscous hydrocarbons where the NMR total porosity is less than the total porosity of the interval.

10. The method of claim 1, wherein:
the immobile or highly viscous hydrocarbons comprise at least one of tar, bitumen, asphaltenes, wax and heavy oil.

11. The method of claim 1, wherein:
determining the total porosity and the permittivity of the noninvaded zone, generating the saturation model of the interval of the formation, comparing the water saturation of the flushed zone for the interval of the formation and the water saturation of the noninvaded zone, and determining that the interval of the formation contains movable hydrocarbon, immobile or highly viscous hydrocarbon, or movable formation water are performed by at least one processor.

12. A system for analyzing a formation traversed by a wellbore, the formation including a flushed zone and a noninvaded zone, the system comprising:
at least one processor configured to perform operations that include:
  determining total porosity and permittivity of the noninvaded zone for an interval of the formation;
  generating a saturation model of the interval of the formation using data obtained from at least one logging device comprising one or more of a resistivity tool, a dielectric tool, and a logging tool run in the wellbore, the saturation model including water saturation of the flushed zone for the interval of the formation and water saturation of the noninvaded zone for the interval of the formation;
  comparing the water saturation of the flushed zone for the interval of the formation and the water saturation of the noninvaded zone for the interval of the formation as provided by the saturation model, wherein comparing, when using a water-based drilling fluid, comprises:
    comparing whether the water saturation of the flushed zone is greater than the water saturation of the noninvaded zone when the water saturation of the noninvaded zone has a value of less than 1;
    comparing whether the water saturation of the flushed zone is equal to the water saturation of the noninvaded zone when the water saturation of the noninvaded zone has a value of less than 1; and
    comparing whether the water saturation of the flushed zone is equal to the water saturation of the noninvaded zone when the water saturation of the noninvaded zone has a value equal to 1;
  wherein comparing, when using an oil-based drilling fluid, comprises:
    comparing whether the water saturation of the flushed zone is greater than the water saturation of the noninvaded zone when the water saturation of the noninvaded zone has a value of less than 1;
    comparing whether the water saturation of the flushed zone is less than the water saturation of the noninvaded zone when the water saturation of the noninvaded zone has a value of less than 1;
    comparing whether the water saturation of the flushed zone is equal to the water saturation of the noninvaded zone when the water saturation of the noninvaded zone has a value of less than 1; and
    comparing whether the water saturation of the flushed zone is less than the water saturation of the noninvaded zone when the water saturation of the noninvaded zone has a value of less than or equal to 1; and
  determining that the interval of the formation contains movable hydrocarbon, immobile or highly viscous hydrocarbon, or movable formation water based on results of said comparing for use in reservoir analysis.

13. The system of claim 12, wherein:
the data used to generate the saturation model is output from the dielectric tool and at least one additional tool run in the wellbore, wherein the dielectric tool measures conductivity and permittivity of the formation at multiple frequencies, and the at least one additional tool measures the total porosity of the formation.

14. The system of claim 12, wherein:
the saturation model provides the water saturation of the noninvaded zone for the interval of the formation given a parameter based on a cementation component "M" and a saturation exponent "N" of a formation matrix provided as an output from the dielectric tool run in the wellbore, wherein the dielectric tool measures conductivity and permittivity of the formation at multiple frequencies.

15. The system of claim 14, wherein:
the saturation model is based on a set of outputs of the dielectric tool, wherein the set of outputs include at least one flushed zone water saturation, flushed zone water filled porosity, flushed zone resistivity, and flushed zone formation salinity for the interval of the formation.

16. The system of claim 12, wherein:
the operations performed by the at least one processor further include:
  in a case that the wellbore is drilled with the oil-based drilling fluid, determining whether water-filled porosity of the flushed zone of the interval of the formation corresponds to bound fluid volume; and
  equating both the water saturation of the flushed zone for the interval of the formation and the water saturation of the noninvaded zone for the interval of the formation to irreducible water saturation when water filled porosity of the flushed zone of the interval of the formation matches bound fluid volume.

17. The system of claim 12, wherein:
the operations performed by the at least one processor further include, upon determining that the water saturation of the flushed zone for the interval of the formation matches the water saturation of the noninvaded zone for the interval of the formation, bypassing said determining that the interval of the formation contains movable hydrocarbon, immobile or highly viscous hydrocarbon, or movable formation water based on results of said comparing.

18. The system of claim 12, wherein:
the operations performed by the at least one processor further include:
  obtaining an NMR total porosity for the interval of the formation from a nuclear magnetic resonance (NMR) tool run in the wellbore;
  comparing the total porosity of the interval of the formation to the NMR total porosity for the interval of the formation; and
  identifying the interval of the formation as containing the immobile or highly viscous hydrocarbons where the NMR total porosity is less than the total porosity of the interval.

19. The system of claim 12, wherein:
the immobile or highly viscous hydrocarbons comprise at least one of tar, bitumen, asphaltenes, wax and heavy oil.

* * * * *